Aug. 26, 1924.
H. J. V. BERTHELSEN ET AL
1,506,154
UNIVERSAL MACHINE FOR JOINERY WORK
Filed Feb. 26, 1924    3 Sheets-Sheet 1
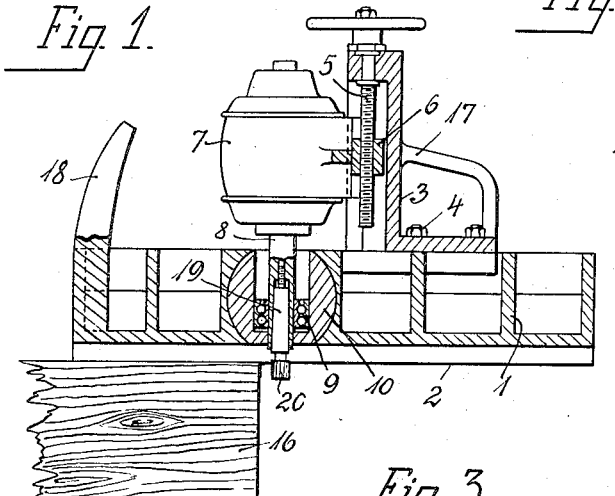
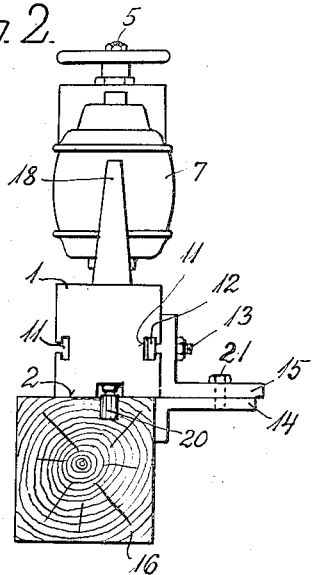
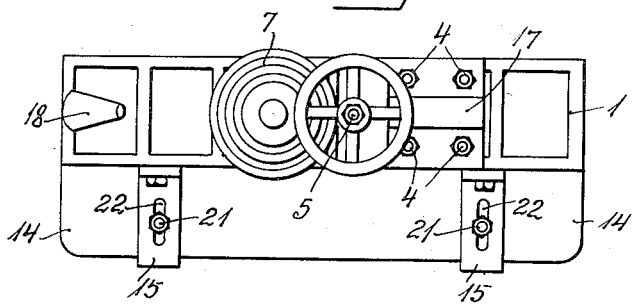
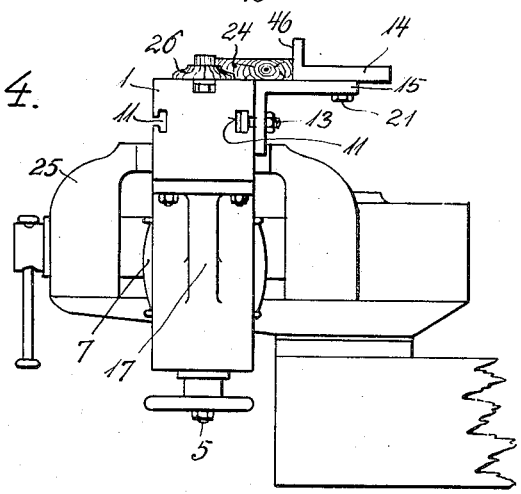
Inventors.
Hans Jens Vilhelm Berthelsen
Axel Louis Hansen
and Jens Jensen
By _____ Attorney.

Aug. 26, 1924.
H. J. V. BERTHELSEN ET AL
1,506,154
UNIVERSAL MACHINE FOR JOINERY WORK
Filed Feb. 26, 1924  3 Sheets-Sheet 2
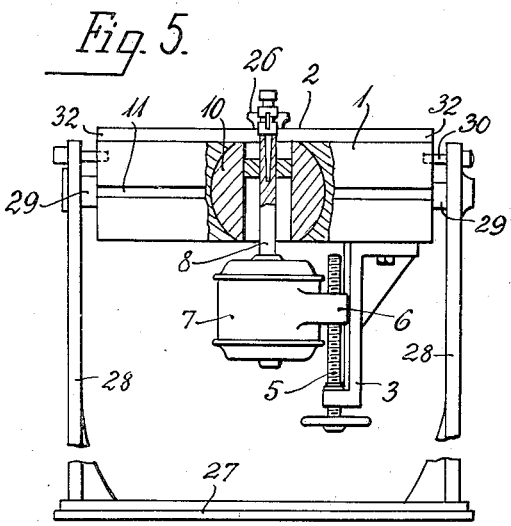
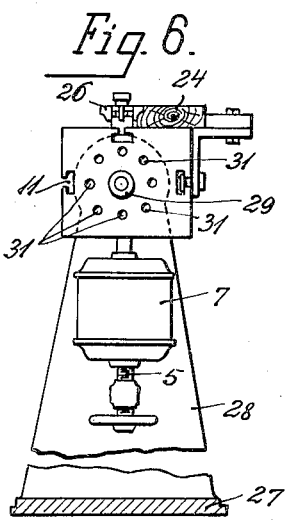
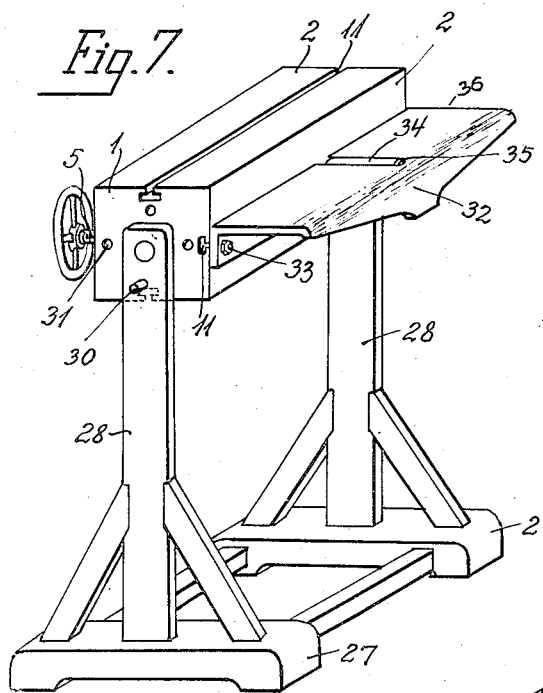
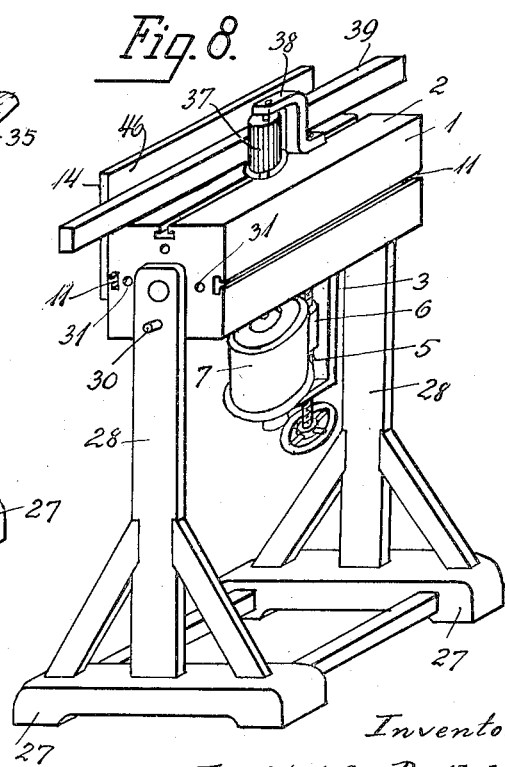
Inventors:
Hans Jens Vilhelm Berthelsen,
Axel Louis Hansen
and Jens Jensen
By their Attorney Aug. 26, 1924.  
H. J. V. BERTHELSEN ET AL  
1,506,154

UNIVERSAL MACHINE FOR JOINERY WORK

Filed Feb. 26, 1924    3 Sheets-Sheet 3

Inventors:
Hans Jens Vilhelm Berthelsen
Axel Louis Hansen
and Jens Jensen
By their Attorney Patented Aug. 26, 1924.

1,506,154

UNITED STATES PATENT OFFICE.

HANS JENS VILHELM BERTHELSEN, AXEL LOUIS HANSEN, AND JENS JENSEN, OF COPENHAGEN, DENMARK.

UNIVERSAL MACHINE FOR JOINERY WORK.

Application filed February 26, 1924. Serial No. 695,293.

*To all whom it may concern:*

Be it known that we, tool manufacturers, HANS JENS VILHELM BERTHELSEN, AXEL LOUIS HANSEN, and JENS JENSEN, subjects of the King of Denmark, residing at Gullandsgade 14, Marstalsgade 7, and Egilsgade 19, respectively, Copenhagen, Denmark, have invented certain new and useful Improvements in Universal Machines for Joinery Work (for which we have applied for patent in Denmark, Apr. 16, 1923; Sweden, June 22, 1923; Germany, June 26, 1923; Austria, Sept. 17 and Oct. 12, 1923, and Czechoslovakia, Sept. 17, 1923), of which the following is a specification.

This invention relates to a machine for joinery work, and the particular object of the invention is to provide a simple and compact machine with power driven tool suitable to minor work shops for the performing of all kinds of joinery work, such as scraping, planing, sawing, cutting, boring, grinding and polishing of wood.

A further object of the invention is to provide a transportable machine of the said kind comprising a body with a plane working face, a motor mounted on the said body, and a tool driving spindle extending through the body and vertical to the said face, and grooves arranged in the faces of the body and adapted to receive suitable securing means for guiding members to guide during the working operation either the piece of work or the machine, if moved by hand.

Another object of the invention is to mount said body in a stationary frame in such a manner, that the entire device comprising the body, the motor, the tool supporting devices and the said guiding members may be adjusted to any desired angular position about a horizontal axis.

The above mentioned and other features of the invention including certain details of design and combinations of parts will be described with reference to the accompanying drawings which illustrate some different applications of the invention, and will be set forth in the claims.

In the drawings

Fig. 1 is a longitudinal section through a planing machine to be moved by hand,

Fig. 2 is an end view of the machine,

Fig. 3 is a plan view of the machine,

Figure 9:
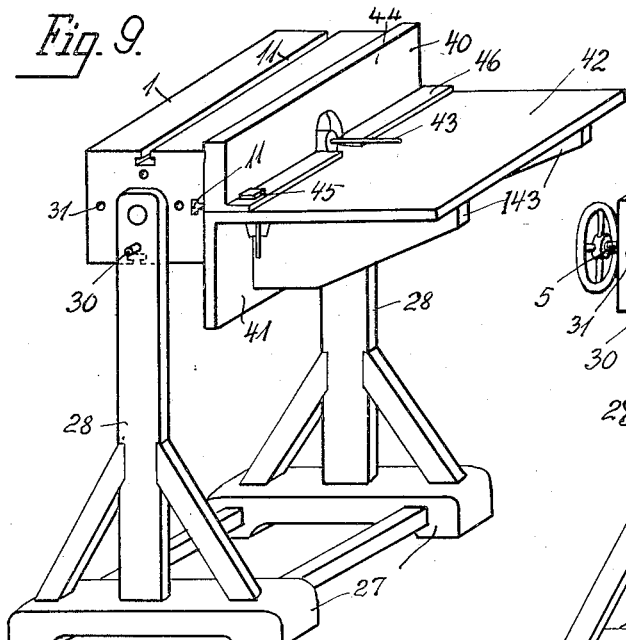
Figure 10:
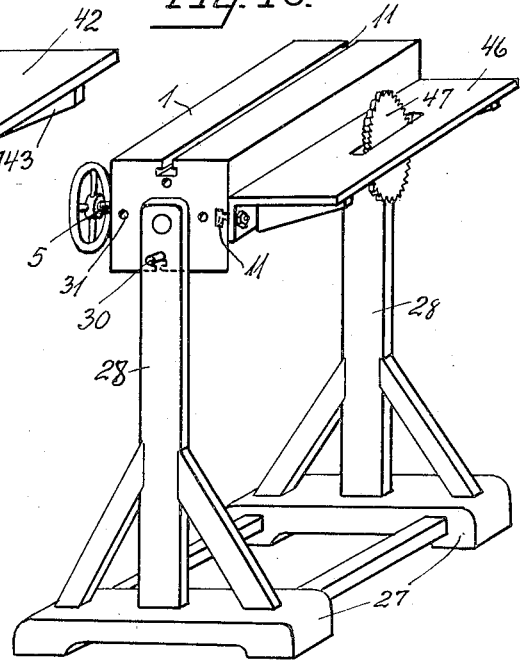
Figure 11:
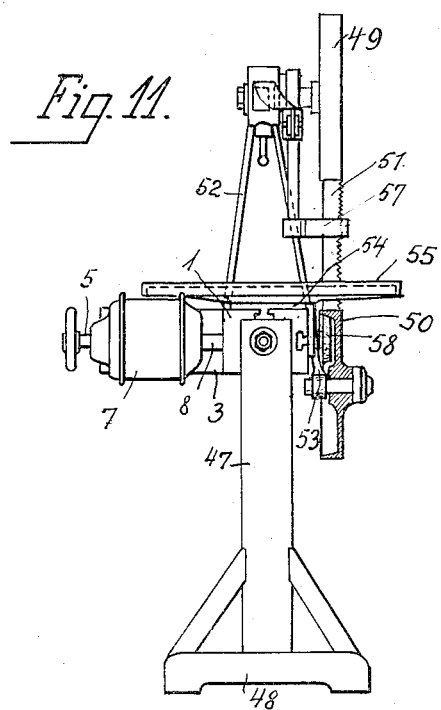
Figure 12:
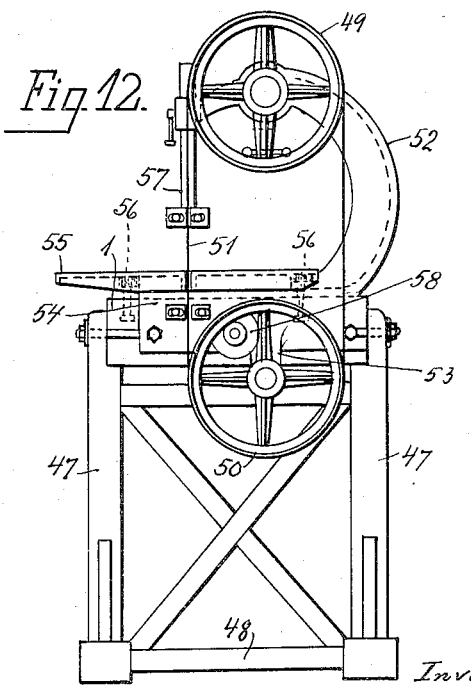

Fig. 4 shows the machine according to Figure 1 secured in a vise and used as a stationary cutting machine, Fig. 5 shows partly in section the machine according to Figure 1 journalled in a frame for use as a transportable cutting machine, Fig. 6 shows an end view of the arrangement according to Fig. 5, Figs. 7 and 8 shows two different applications of a planing machine according to Figure 5, Fig. 9 shows the machine according to Figure 6 applicable as boring machine, Fig. 10 shows the machine according to Figure 6 applicable as a sawing machine and Figs. 11 and 12 show a band saw machine according to the invention.

1 is a body of cast-iron, steel, strong wood or the like, having a substantially rectangular cross-section and a plane work engaging face 2. 3 is a bracket mounted on the body 1 and rigidly secured to the same by means of screws 4. 5 is an adjusting screw journalled in the top of the bracket 3 and engaging a sledge 6 on an electromotor 7, supported by the screw 5 by means of said sledge 6. When turned the screw 5 will travel the motor vertically to the body 1. The shaft 8 of the motor extends through the body 1 in a position perpendicular or substantially perpendicular to the plane of the face 2.

9 is a ball bearing, which guides the shaft 8 in a cylindrical member 10, inserted in a transverse cylindrical bore in the body 1, thus enabling the ball bearing 9 to appear in a position, in which the axis of said bearing coincides with the axis of the shaft 8.

11 are kerned grooves or notches, arranged in the side faces of the body and adapted to receive the heads 12 of bolts 13, by means of which suitable guiding members or rails 14—15 for the matter to be treated (Figure 4), or for the machine, if moved by hand over the said matter (Figure 2), may be secured to the body 1.

According to Figures 1–3 the device is adapted to be moved by hand over the matter 16 to be treated. For this purpose the bracket is provided with a handle 17, and a plane handle 18 is secured to the front end of the body 1.

Figures 1 and 2 illustrate the use of the machine for cutting a groove in a beam 16. The lower end of the shaft 8 is hollow to receive in known manner the rear end 19 of a cutter 20.

By means of the screw 5 the motor and thereby the cutter 20 secured to the end of the motor shaft is adjusted vertically to the plane of the face 2, until the projection of the cutter 20 beyond the face 2 corresponds to the desired depth of the groove to be cut. The operator then starts the motor 7 and grasps the handles 17 and 18 and places the front part of the face 2 on the surface of the beam 16 as shown in Figure 1. The operator then pushes the device lengthwise over the beam 16 whereby the cutter 20 will cut the desired groove therein.

The distance of the said groove from the edge of the beam is determined by the guiding rail 14 fixed to other rails 15 by means of screws 21, said rails 15 being secured to the body 1 by means of the screws 13 engaging a groove 11 in the body 1. During the operation the rail 14 slides along the side face of the beam and guides the device. The screws 21 extend through oblong holes 22, Figure 3, in the rails 15, thus enabling an adjustment of the rail 14 on the rails 15 transversely to the body 1. The distance between the edge of the beam 16 and the desired groove in the same may thereby be regulated.

According to Figure 4 the machine described above is used for profiling a wooden list 24. The body 1 is fixed in a vise 25, and a profile cutter 26 is secured to the shaft 8 of the motor. The rails 14 serve as guides for the list 24 to be treated, said list being pushed over the face 2 along the vertical guiding face 46 of the rail 14.

Instead of being fixed in a vise 25 the body 1 may be journalled in a frame (Figures 5 to 10) comprising a socket plate 27 and two brackets 28 in which the body 1 is supported by pivots 29 enabling the body 1 to be adjusted about a horizontal axis. The body 1 may be secured in any desired angular position by means of pins 30, which extend through holes in the upper parts of the brackets 28 and may be pushed into any of a number of holes 31 in the adjacent end face 32 of the body 1. By the arrangement shown in the Figures 5 to 6 no handles corresponding to the handles 17 and 18 in Figures 1 to 4 are provided.

The Figures 5 to 10 illustrate the use of the frame-supported machine for various joinery work.

According to the Figures 5 and 6 the machine is used for profiling a wooden list 24, in the manner just described above in respect to Figure 4. The body 1 is adjusted to have a horizontal work engaging face 2.

In the arrangement shown in Figure 7 the machine is intended for use as a planing device. A plane working table 32 is secured to the body 1 by means of bolts 33, the heads of which engage the groove 11 in the plane working face 2, being adjusted in a vertical position. A cylindrical planing-cutter 34 is secured to the end of the motor shaft. A fissure 35 is provided in the table 32 parallel to the axis of the cutter 34 the circumference of which extends through said fissure and projects over the face 36 of the table. The matter to be treated is pushed over the face 36 transversely to the cutter 34, and may be guided by the face 2 on the body 1.

Figure 8 illustrates the use of the machine for planing with a vertically disposed motor shaft. The arrangement differs from the arrangement according to the Figures 5 and 6 only by the fact that the profile-cutter 26 is replaced by a cylindrical planing cutter 37 secured in any suitable manner to the motor shaft. The upper end of the cutter 37 is pivoted on a bracket 38, secured to the body 1 by bolts engaging the groove 11 in the face 2. The matter 39 to be treated is pushed over the face 2 along the vertical face 46 of the rail 14, which is secured to the body 1 in the manner described above in respect to Figure 4.

In the arrangement according to Figure 9 the machine is intended for use as a boring device. A rail 40 of wood or iron is secured to the plane face 2 of the body 1 in any suitable manner for instance by means of bolts engaging the groove 11 in said face. A suitable bore 43 projecting the free vertical face 44 of said rail 40 is secured to the motor shaft, and a bracket 41 comprising a plane supporting table 42 for the matter to be treated and a number of supporting members 143 integral to the said table are fixed to the rail 40 by means of bolts 45 extending through the table 42 and a flange 46 on said rail 40. The upper face of the table 42 is located below the bore 43, the distance between the latter and the table corresponding to the distance between the center of the desired boring in the matter to be treated and the supporting face of the said matter, which is slidden on the face 42 during the boring.

In the arrangement shown in Figure 10 the machine is intended for use as a sawing machine. The table 32, Figure 6, is here replaced by a table 46 having a split parallel to the face 2 on the body 1. A circular saw disc 47 is secured to the motor shaft below the table 46, and the saw disc 47 extends through a fissure in the table and projects over the upper surface of the same, as shown in Figure 10. The use of this arrangement needs no explanation.

The Figures 11 and 12 show a band sawing machine according to the invention. The body 1 described above is rigidly secured to two vertical supporting members 47, which together with a socket 48 forms a supporting frame for the machine comprising the said body 1, the motor 7, the bracket 3 mounted thereon, and a saw band device which consists of two saw pulleys 49 and 50 and a saw band 51 running on said pulleys. The pulleys 49 and 50 are journalled each in a bracket 52 and 53, respectively, forming integral parts of an L-shaped rail or supporting device 54, which by means of bolts 56 engaging the grooves 11 is to be secured to the body 1 in such a manner, that the inner faces of the rail are juxtaposed to two side faces of the body 1 as shown in Figure 11. A horizontal table 55 through which the saw band 51 passes, is fixed upon the horizontal upper part of the rail 54 by any suitable securing means. 57 is a guide of known kind for the saw-band, said guide being adjustably supported by the bracket 52.

A friction roller 58 engaging the inner circumference of the pulley 50 is secured to the motor shaft 8. When the motor 7 is started, the roller 58 will drive the saw pulley 50 by friction action, thereby causing the saw band to move over the said pulleys. The matter to be treated is to be supported by the table 55, and in known manner should be pushed over the same against the saw band.

Having now particularly described and ascertained the nature of our said invention and in what manner the same is to be performed, we declare that what we claim is:—

1. A universal machine for joinery work comprising in combination a body having a plane work engaging face, a motor on the body, a shaft coupled to the motor and extending through the body in substantially perpendicular relation to the plane of said face, means for coupling a tool to said shaft and grooves arranged in the body for the purpose of securing to said body suitable guiding members for the matter to be treated.

2. A universal machine for joinery work comprising in combination a body having a plane work engaging face, a motor mounted on said body and having its shaft extending through the body in substantially perpendicular relation to the plane of said face, means for coupling a tool to the end of the motor shaft, and grooves arranged in the body for the purpose of securing to said body suitable guiding members for the matter to be treated.

3. A universal machine for joinery work comprising in combination a body having a plane work engaging face, a motor mounted on the body and having its shaft extending through the frame in substantially perpendicular relation to the plane of said face, means for adjusting the shaft vertically to said face, means for coupling the tool to said shaft, and grooves arranged in the body for the purpose of securing to said body suitable guiding members for the matter to be treated.

4. A universal machine for joinery work comprising in combination a body, grooves arranged therein for the purpose of securing to same suitable guiding members, a bracket mounted on the body, a motor adjustably mounted on said bracket and having its shaft extending through the body substantially perpendicular to the plane work engaging face of the same, means for adjusting the motor on said bracket in vertical relation to the said face and means for coupling a tool to the end of the motor shaft extending through the body.

5. A universal machine for joinery work comprising in combination a body, a bracket on said body, a motor adjustably mounted on said bracket and having its shaft perpendicular to a plane work engaging face of the body, an adjusting screw mounted in the bracket and engaging the motor for the purpose of travelling the same on the bracket vertically to said face, means for coupling a tool to the end of the motor shaft, and grooves arranged in the body for the purpose of securing to said body suitable guiding members for the matter to be treated.

6. A universal machine for joinery work comprising in combination a body, a bracket on said body, a motor adjustably mounted on said bracket, an adjusting screw engaging the motor in order to travel the same on the bracket vertical to a plane work engaging face of the body, means for coupling a tool to the motor shaft, extending through the body, perpendicular to said face, grooves arranged in the body for the securing of suitable guiding members for the matter to be treated and a frame wherein the body is journalled, adjustably about a horizontal axis.

7. A band saw machine comprising in combination a body, a frame wherein the body is journalled about a horizontal axis, a bracket on said body, a motor mounted on the bracket and having its shaft perpendicular to the plane work engaging surface of the body, an adjusting screw mounted in the bracket for travelling the motor on the bracket vertical to said face, grooves in the body for the reception of securing means for suitable guiding members for the matter to be treated, a saw pulley device, mounted on the body by means of securing member engaging said grooves, said device comprising a saw band and two saw pulleys and a pinion secured to the shaft of the motor and engaging one of said saw pulleys.

In testimony whereof they affix their signatures.

HANS JENS VILHELM BERTHELSEN.
AXEL LOUIS HANSEN.
JENS JENSEN.